United States Patent
Dimitrov et al.

(10) Patent No.: US 9,889,990 B2
(45) Date of Patent: Feb. 13, 2018

(54) POWER DRIVE UNIT WITH POWER-OFF DYNAMIC BRAKE

(71) Applicant: Ancra International LLC, Azusa, CA (US)

(72) Inventors: Daniel Dimitrov, Torrance, CA (US); John Nica, Azusa, CA (US); Roy Yamatoku, Torrance, CA (US)

(73) Assignee: Ancra International LLC, Azusa, CA (US)

( * ) Notice: Subject to any disclaimer, the term of this patent is extended or adjusted under 35 U.S.C. 154(b) by 270 days.

(21) Appl. No.: 14/934,829

(22) Filed: Nov. 6, 2015

(65) Prior Publication Data
US 2016/0130089 A1    May 12, 2016

Related U.S. Application Data

(60) Provisional application No. 62/077,668, filed on Nov. 10, 2014.

(51) Int. Cl.
*B65G 13/075* (2006.01)
*B60L 7/04* (2006.01)
*B60L 15/20* (2006.01)
*B64D 9/00* (2006.01)
*H02P 3/12* (2006.01)
(Continued)

(52) U.S. Cl.
CPC .............. *B65G 13/075* (2013.01); *B60L 7/04* (2013.01); *B60L 15/2009* (2013.01); *B64D 9/00* (2013.01); *B65G 13/06* (2013.01); *H02P 3/12* (2013.01); *H02P 3/22* (2013.01); *H02P 6/24* (2013.01); *B60L 2220/16* (2013.01); *B60L 2240/423* (2013.01); *B64D 2009/006* (2013.01); *Y02T 10/644* (2013.01); *Y02T 10/645* (2013.01); *Y02T 10/72* (2013.01); *Y02T 10/7275* (2013.01)

(58) Field of Classification Search
CPC .................................................... B65G 13/075
USPC .................................................... 318/375, 362
See application file for complete search history.

(56) References Cited

U.S. PATENT DOCUMENTS 4,216,420 A * 8/1980 Jinbo ..................... H02P 3/08
                                                        318/370
2004/0222761 A1   11/2004 Jockel

FOREIGN PATENT DOCUMENTS

EP    1 162 726 A1   12/2001
GB    2463235        10/2010

OTHER PUBLICATIONS

Extended European Search Report for 15193168.00, dated Jul. 4, 2016, 8 pp.

* cited by examiner

*Primary Examiner* — David S Luo
(74) *Attorney, Agent, or Firm* — Brinks Gilson & Lione

(57) ABSTRACT

An electromechanical actuator power drive unit for dynamic braking is provided, comprising an electric motor with a stator, a rotor that rotates with respect to the stator, and windings fixed to the stator. There is a control unit configured to supply a current to the windings. When the control unit is not supplying current to the windings, an electrical device allows current to flow through a parallel current path to the windings. The new current is generated by the interaction of a roller connected with a gear set to the rotor. The roller, and therefore the rotor, is urged in a rotational direction by the translational velocity of a load in contact with the roller. The new current generated by the rotating rotor flows in the opposite direction as the first current (Continued)

supplied by the power supply unit and creates a dynamic braking torque in the electric motor.

20 Claims, 3 Drawing Sheets

(51) Int. Cl.
*H02P 3/22* (2006.01)
*H02P 6/24* (2006.01)
*B65G 13/06* (2006.01)

POWER DRIVE UNIT WITH POWER-OFF DYNAMIC BRAKE

CROSS REFERENCE TO RELATED APPLICATIONS

This application claims priority from U.S. Provisional Application No. 62/077,668, filed on Nov. 10, 2014, the entirety of which is hereby fully incorporated by reference herein.

TECHNICAL FIELD

The present disclosure relates to a power drive unit suitable for automatically moving cargo within a cargo compartment.

BACKGROUND

The present application may utilize aspects described in U.S. Pat. No. 7,014,038, which is hereby incorporated herein by reference. Reference is made to U.S. Pat. No. 7,014,038, for a discussion of a power drive unit for automatically moving cargo within a cargo compartment useful with the present disclosure.

Roller assemblies may be removably mounted upon the floor of a cargo or other compartment of a vehicle, such as an aircraft, and are widely used for conveying cargo within such vehicles. These roller assemblies or "actuators" are intended for use in systems which involve the transport of commercial and military cargo containers commonly used in the air cargo, ground cargo (trucking), rail cargo and shipboard cargo industries. The actuator installs into a cargo transport vehicle, and provides motive force and holding (i.e., braking) for the containers within the vehicle.

The actuator, commonly called a power drive unit or powered drive unit (PDU), works in conjunction with external support equipment to facilitate the loading and unloading of the cargo containers into and out of the vehicle. The PDU typically incorporates a fixed frame or support base rigidly attached to the floor or floor structure of the cargo vehicle. A moving drive assembly is attached to the support base. The drive assembly includes drive roller or rollers for contacting the cargo containers and providing motive force to them by means of the frictional coefficient between an elastomeric roller surface and the container bottom, and a motor for rotating the drive roller. Cargo container bottoms are generally smooth, metallic coverings attached to a square or rectangular frame structure; however, they may also be made of non-metallic material such as wood or reinforced plastic.

The PDU also typically incorporates a lift mechanism which raises the drive assembly from its lowered position into abutment against the cargo container bottom, as by rotating cams on a common camshaft against reaction points or bearing sin the support base. The lift mechanism also can be engaged to hold the container in place when the drive roller is not turning, to prevent the unintended motion of containers in the vehicle.

When drive and/or hold commands are removed from the PDU, the PDU drive assembly lowers to its retracted position. The cargo containers are typically supported by a plurality of free turning cylindrical rollers, ball transfer units or caster assemblies, which are collectively referred to as the conveyance hardware. When the PDU is retracted, the containers usually are free to move on the conveyance hardware, and are typically held in position during vehicle motion by latches, guides and other restraint hardware.

SUMMARY

It is, therefore, an object of the present disclosure to provide a dynamic braking torque in the event of power loss from a power drive unit without the need for a backup or separate power source to supply the current needed for dynamic braking.

A further object of the present disclosure is to allow human force to be able to move the load in the event of power loss by the system when it is in a dynamic braking mode.

Yet another object of the present disclosure is to prevent a reduction of performance in the power drive unit by having a variable braking torque depending on the weight and speed of the load being propelled by the system.

The present disclosure is an electromechanical actuator power drive unit for dynamic braking. There is an electric motor with a rotor and windings and a control unit that supplies an electric current to the windings. There is also an electrical device in series with the windings that creates a separate, alternate, circuit with the windings when the control unit is not supplying an electric current. At least one roller is operably connected to the electric motor and is configured to carry a load. During power loss to the electric motor from the control unit, the load has a velocity. The velocity of the load rotates the rotor in the electric motor and creates a rotor velocity. The rotating rotor creates an electric current in the windings in the opposite direction as the electric current that was coming from the control unit.

Therefore, the electric current, created as a result of the load on the rollers rotating the rotor, creates a dynamic braking torque in the electric motor. The dynamic braking torque is proportional to the speed of the load, so that lighter loads will use very little dynamic braking force or none if it can be stopped with friction alone, while faster moving loads will be countered by a greater dynamic braking force to also travel at a controlled speed. Human input and friction are two forces that can affect the speed of the load.

Advantages of the disclosed devices will become more apparent to those skilled in the art from the following description of embodiments that have been shown and described by way of illustration. As will be realized, other and different embodiments are contemplated, and the disclosed details are capable of modification in various respects. Accordingly, the drawings and description are to be regarded as illustrative in nature and not as restrictive.

DETAILED DESCRIPTION

Aircraft cargo loading systems are designed to assist with loading large containers or loads into aircraft. The containers or loads rest on rollers that are normally powered by an electric power drive unit, which often includes a brushless DC motor, but can otherwise include different types of prime movers. The velocity of the rollers carrying the containers (i.e., the load) is controlled by the motor speed of the power drive unit. If there is an electrical power loss to the power drive unit, there is nothing to prevent the containers or load from freely moving on the rollers at any speed. Some conventional aircraft cargo loading systems do not include any systems or structure to provide braking or resistance force to prevent or slow movement upon the power drive unit during power loss.

Other aircraft cargo loading systems may include a backup system to supply a braking force in the event of power loss to the power drive unit. Some backup braking systems for aircraft cargo loading systems use a backup generator or other power source to provide a braking force when the power drive unit experiences a power loss. These backup systems typically use mechanical braking rollers, which have a constant torque. One disadvantage to having a constant braking torque applied to the rollers is that the containers or load cannot be moved with manual, human power. Therefore, during power loss to the power drive unit, loading and unloading operations must cease. The constant braking torque opposes the work done by the power drive unit, which may reduce the performance of the powered system.

Figure 1:
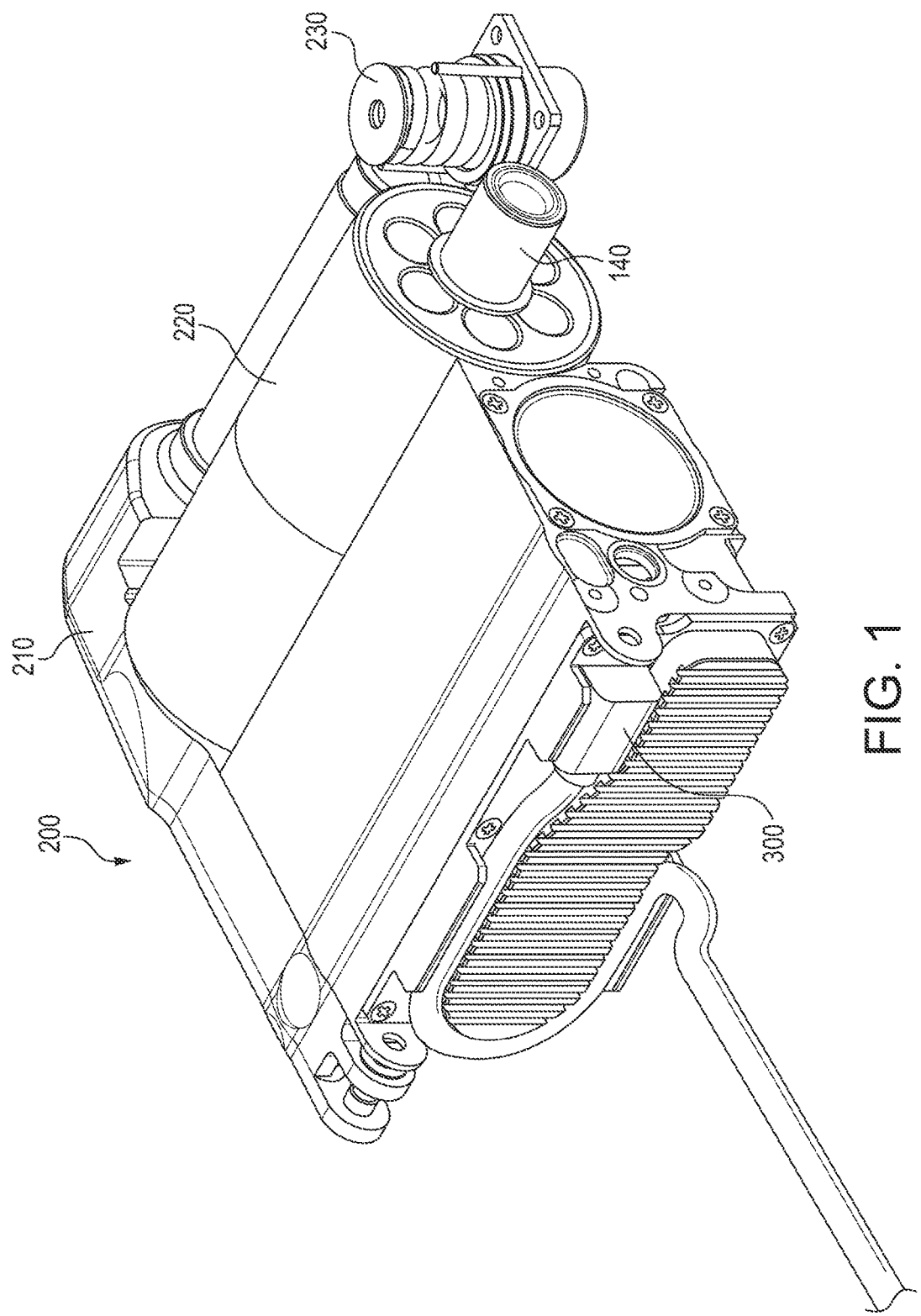
FIG. 1 is a perspective view of an apparatus in accordance with an embodiment of the present disclosure.

One embodiment of a typical PDU 200 for use with aircraft cargo loading systems is depicted in FIG. 1. The system 200 may include a drive assembly 210, a drive roller 220, a spring mechanism 230, a rotor 140, and an input/output port 300. The drive assembly 210 may include the drive roller 220, which may have an elastomeric outer surface, and means for rotating the roller 220, such as an electronically controlled electric motor, such as motor 120 described below. The roller 220 may be adapted to receive a rotor 140, which may be connected to the motor 120. The spring mechanism 230 keeps the roller 220 in driving abutment against cargo, such as load 150 described below, regardless of whether the motor 120 is supplying power to the system 200.

Figure 2:
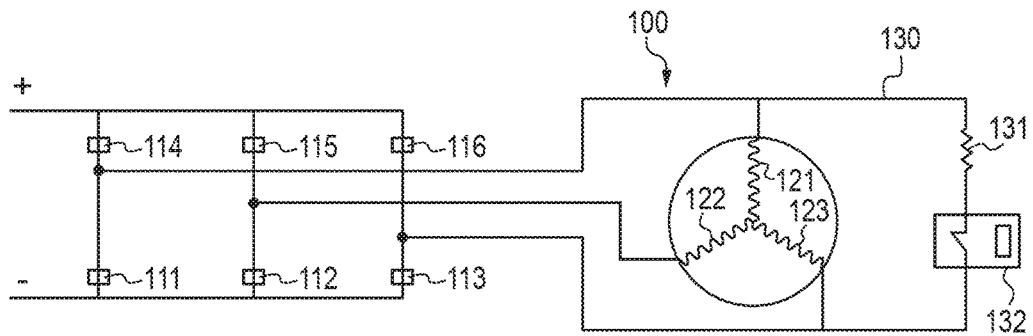
FIG. 2 is an electrical schematic of a circuit that may be used in the power drive unit for dynamic braking.

Turning now to FIG. 2, an embodiment of an electromechanical actuator power drive unit is provided. The dynamic braking system 100 may include a control unit 110, a motor 120, such as a brushless DC motor, and a dynamic brake relay circuit 130, such as the circuit shown in FIG. 2b. In some other embodiments, the motor 120 may be a different type of motor that allows for dynamic braking such as a step or brushed DC motor. The control unit 110 may be connected to an external power supply such as with a plugged or hardwired connection, or the like. In another embodiment, the control unit 110 may be connected with a battery and a suitable DC/AC converter, if applicable. The external power supply that is supplied to the control unit 110 may be between 110 volts and 480 volts, inclusive of any appropriate voltage, such as 220 volts, within this range. In yet another embodiment, the power supply may also be from a standard AC or DC aircraft ground power unit such as a three-phase, 115 VAC/400 Hz power supply, or a 28 VDC power supply. The control unit 110 may comprise one or more switchable or selectable components to selectively allow current to pass, but also selectively prevent current flow therethrough. In some embodiments, the components may be transistors, switches or other components. For the sake of brevity the components are referred to herein as transistors, but one of ordinary skill in the art will appreciate with a thorough review of this specification that other known components may be used.

Figure 2A:
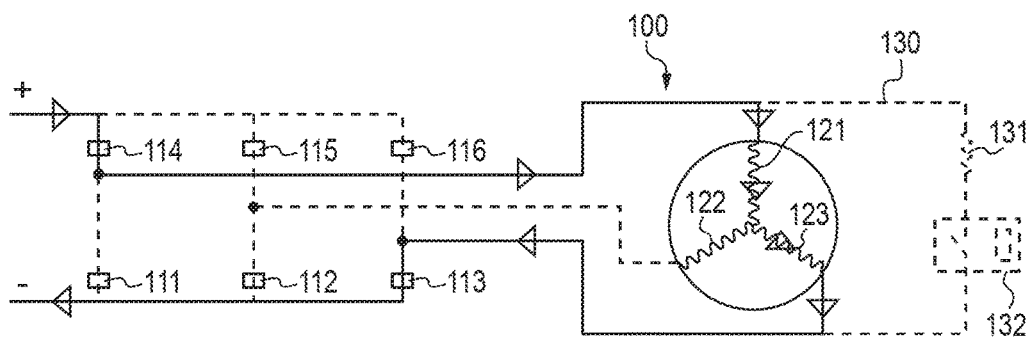
FIG. 2a is an electrical schematic of one current path in a circuit that may be used in the power drive unit for dynamic braking.
Figure 2B:
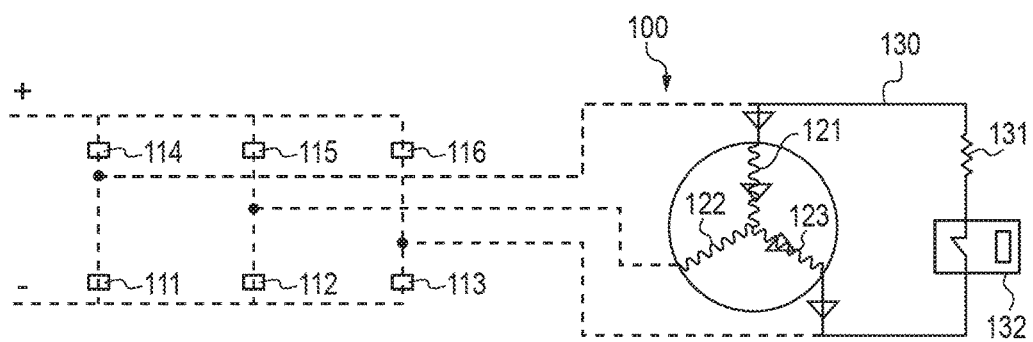
FIG. 2b is an electrical schematic of a parallel current path in a circuit that may be used in the power drive unit for dynamic braking.

As illustrated, the control unit 110 may include transistors 111, 112, 113, 114, 115, and 116 (shown schematically in FIGS. 2, 2a, and 2b). Together, a DC/AC converter and the one or more transistors may be operate as an inverter. The motor 120 may include a stator 124 with a single winding or, in some embodiments, three-phase windings 121, 122, and 123. In this embodiment, a plurality of transistors 111-116 are in series with the stator windings 121-123 to selectively supply current through the stator windings 121-123. The dynamic brake relay circuit 130 may include a resistor 131 in series with a relay 132 and the stator windings 121 and 123. The resistor 130 may have a resistance value. In some embodiments, the resistor 131 may be a permanent or variable type. The contact of relay 132 may be NC (normally closed), which therefore opens when electrical power is present. The contact of relay 132 may be closed when the dynamic brake relay circuit 130 is operative (in power loss mode), as shown in FIG. 2b. The contact of relay 132 may be opened when the dynamic brake relay circuit 130 is rendered inoperative (with an electric power supply present), allowing the motor drive invertor 110 to operate without the resistor 131, as shown in FIG. 2a. Those skilled in the art will understand that other types of electrical devices that can prevent current from flowing through a circuit until power is no longer supplied to that electrical device may also be used instead of a relay, such as a depletion mode FET (field effect transistor) or another type of mechanical or solid state relay. A depletion mode FET would be have a gate that is electrically connected to the control unit 110, which would allow current to only flow though the depletion mode FET when the control unit 110 is not supplying power.

In one embodiment of the disclosure, when the control unit 110 supplies power and turns on transistors 114 and 113, current will flow into stator winding 121 and out of stator winding 123, while stator winding 122 is idle, as shown in FIG. 2a. When the control unit 110 supplies power and turns on transistors 116 and 112, current will flow into stator winding 123 and out of stator winding 122, while stator winding 121 is idle. When the control unit 110 supplies power and turns on transistors 115 and 111, current will flow into stator winding 122 and out of stator winding 121, while stator winding 123 is idle. When the control unit 110 losses power and does not supply a current to the electric motor 120, the relay 132 will automatically close rendering a dynamic brake relay circuit 130 operative.

Figure 3:
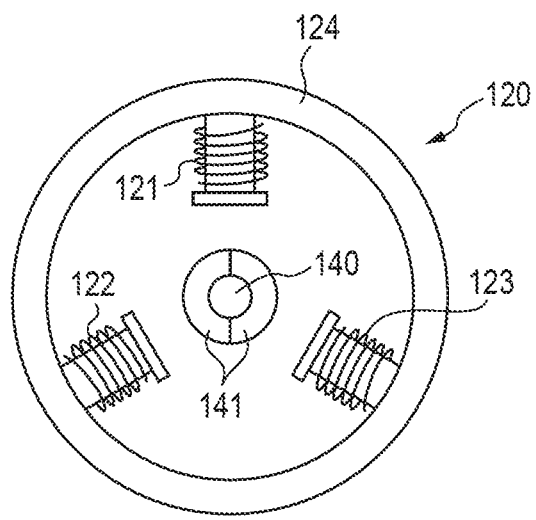
FIG. 3 illustrates a cross-sectional view of a brushless DC motor suitable for use within the circuit of FIGS. 2, 2a, and 2b.

The rotor 140 shown in FIG. 3 is part of the motor 120 and may contain permanent magnets 141. When the control unit 110 is supplying power to the motor 120, it is also selectively enabling the transistors 111-116 to transfer current in a sequence, thereby energizing the stator windings 121-123 and generating a rotating magnetic field. The rotating magnetic field will be created in stator windings 121-123 shown in FIG. 3 which will interact with magnetic fields generated by the permanent magnets 141 fixed to the rotor 140. The interaction between the changing magnetic fields in the stator windings 121-123 and the magnetic fields created by the permanent magnets 141 fixed to the rotor 140 will cause the rotor 140 to rotate.

Figure 4:
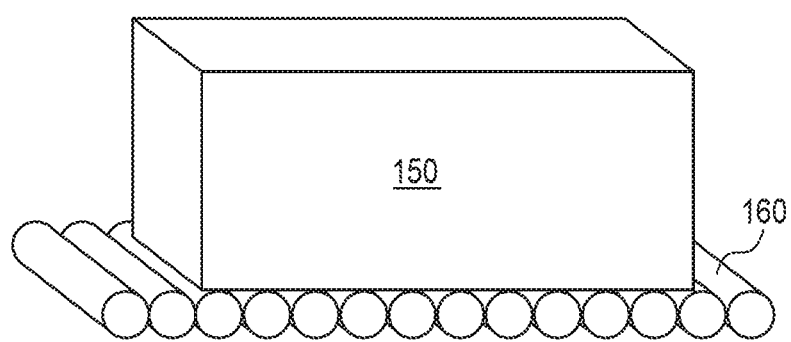
FIG. 4 provides a simplified schematic of a load on rollers for aircraft cargo loading.

FIG. 4 illustrates an example of a load 150 being supported and carried by rollers 160. The rollers 160 may be operably connected to the rotor 140 in FIG. 3 by a transmission. When the control unit 110 is supplying power to the motor 120, the motor 120 causes the rotor 140 to rotate. When the rotor 140 rotates, it drives the rollers 160 to rotate with rotation of the rotor 140. The rotating rollers 160 may propel the load 150. The load 150 may then be transported within a cargo area such as within a cargo compartment of an aircraft.

When the control unit 110 is not supplying power to the motor 120, the control unit 110 is also not supplying power to the relay 132 to hold the relay 132 in the opened position. Therefore, when the control unit 110 is not supplying power to the motor 120, the relay 132 closes automatically creating a closed dynamic brake relay circuit 130 between the stator windings 121 and 123 and the resistor 131, as illustrated in FIG. 2b. In such an embodiment, stator winding 122 would remain idle while the control unit 110 is not supplying power to the motor 120. Also, when the control unit 110 is not supplying power to the motor 120, the stator windings 121-123 are not being energized by the control unit 110, as shown in FIG. 2a. Therefore, the stator windings 121-123 do not create magnetic fields, and therefore, do not cause the rotor 140 to rotate.

Instead, when the control unit 110 is not supplying power to the motor 120, the velocity of the load 150 may urge the rotation of the rollers 160, as the load translates over the rollers 160 due to frictional forces therebetween, causing the rollers 160 to rotate without input from the rotor 140. The rotating rollers 160 may instead cause the rotor 140 to rotate. The rotating rotor 140 creates a voltage in the stator windings 121 and 123 that creates a parallel current flow through the dynamic brake relay circuit 130 in the opposite direction to the current flowing through the stator windings 121-123 when the control unit 110 was supplying power to the system. This is illustrated in FIGS. 2a and 2b. A person of skill in the art after a thorough review of this disclosure would understand that the current flowing through the stator windings 121-123 through the dynamic brake relay circuit 130 would be in the same direction that the back electromotive force (EMF) was flowing when the control unit 110 is supplying power. The parallel current flow creates a magnetic field in the stator windings 121 and 123. The magnetic field in the stator windings 121 and 123 interacts with the permanent magnets 141 in the rotor 140 so that the magnetic field in the stator windings 121 and 123 may oppose the force of the permanent magnets 141 in the rotor 140. This interaction creates a dynamic braking torque that slows the rotating velocity of the rotor 140 down or limits the rotating velocity of the rotor 140 in the motor 120. When the rotating velocity of the rotor 140 is retarded, this may also provide resistance against the rotation of the rollers 160 carrying a load 150, thereby limiting the velocity of the load 150.

The lower the velocity of the load 150, the lower the rotational velocity of the rollers 160, due to the frictional forces between the surface of the load 150 and the rollers 160. The lower the rotational velocity of the rollers 160, the lower the rotational velocity of the rotor 140. The lower the rotational velocity of the rotor 140, the lower the current generated in the stator windings 121 and 123 based upon the relative rotation of the rotor 140 with respect to the stator 124, and the weaker the magnetic field formed in the stator windings 121 and 123. When a weaker magnetic field is formed in the stator windings 121 and 123, there will be less of an opposing force provided to the permanent magnets 141 fixed to the rotor 140. Therefore, the lower the velocity of the load 150, the lower the dynamic braking torque applied to resist the translational velocity of the load 150. Frictional force may also contribute to reducing the translational velocity of the load 150 due to resistance of rotation of the rotor 140. The dynamic braking torque may be proportional to the velocity of the rotor 140 and the resistance value of the resistor 131.

Conversely, the greater the velocity of the load 150, the higher the rotational velocity of the rollers 160, due to the frictional forces between the surface of the load 150 and the rollers 160. The higher the rotational velocity of the rollers 160, the higher the rotational velocity of the rotor 140. The higher the rotational velocity of the rotor 140, the higher the current generated in the stator windings 121 and 123 based upon the relative rotation of the rotor 140 with respect to the stator 124, and the stronger the magnetic field formed in the stator windings 121 and 123. When a stronger magnetic field is formed in the stator windings 121 and 123, there will be a greater opposing force provided to the permanent magnets 141 fixed to the rotor 140. Therefore, the higher the velocity of the load 150, the higher the dynamic braking torque applied to resist the translational velocity of the load 150 due to the resistance of rotation of the rotor 140. Human input may also be a force that causes the load 150 translate faster.

The resistance value of the resistor 131 will also affect the retarding force of the system. A resistor 131 with a lower resistance value will allow more current to flow through the dynamic brake relay circuit 130. Allowing more current to flow through the dynamic brake relay circuit 130 will create a stronger magnetic field in the stator windings 121 and 123. The stronger the magnetic field in the stator windings 121 and 123, the larger the retarding or dynamic braking force will be. In other words, there will be a stronger force opposing the permanent magnets 141 in the rotor 140.

Conversely, a resistor 131 with a higher resistance value will allow less current to flow through the dynamic brake relay circuit 130. Allowing less current to flow through the dynamic brake relay circuit 130 will create a weaker magnetic field in the windings 121 and 123. The weaker the magnetic field in the stator windings 121 and 123, the less retarding or dynamic braking force there will be. In other words, there will be a weaker force opposing the permanent magnets 141 in the rotor 140. This will allow the load 150 to move more freely because the dynamic braking on the rotor 140 will be less.

In one exemplary embodiment, the resistor 131 may be 220 ohms/50 watts. In other embodiments, the resistor 131 may have a different resistance value, or within a range of resistance values. One of ordinary skill in the art with a thorough review of this specification will be able to choose the proper resistance value of the resistor 131, which may be a function of the specifications of the specific motor used.

While the preferred embodiments of the disclosure have been described, it should be understood that the disclosure is not so limited and modifications may be made without departing from the invention. The scope of the invention is defined by the appended claims, and all devices that come within the meaning of the claims, either literally or by equivalence, are intended to be embraced therein.

What is claimed is:

1. An electromechanical actuator power drive unit for dynamic braking comprising:
   an electric motor comprising a stator and a rotor that is rotatable with respect to the stator, and windings;
   a control unit configured to supply a first electric current to the windings;

an electrical device in series with the windings;
wherein the electrical device allows current to flow through a parallel current path when the control unit is not supplying the first electric current to the windings;
at least one roller operably connected with a transmission to the rotor, the at least one roller configured to receive a load, and rotate when the load translates over the at least one roller;
wherein the translation of the load urges the rotation of the at least one roller, wherein the electrical device allows current to flow through the parallel current path and when the control unit is not supplying the first electric current to the windings, the rotating rotor generates a second electric current in the windings in the opposite direction as the first electric current; and
wherein the second electric current creates a dynamic braking torque in the electric motor.

2. The electromechanical actuator power drive unit in claim 1, wherein the electric motor is a brushless DC motor having an inverter.

3. The electromechanical actuator power drive unit in claim 1, wherein the electric motor is a brushed DC motor.

4. The electromechanical actuator power drive unit in claim 1, wherein the electrical device is a relay having a normally closed contact, wherein the control unit is configured to supply current to open the contact when the control unit is energized.

5. The electromechanical actuator power drive unit in claim 1, wherein the electrical device is an electronic device configured to close the separate circuit with the windings when the control unit is not energized.

6. The electromechanical actuator power drive unit in claim 1, wherein the electrical device is a depletion mode FET (field effect transistor), wherein the control unit is electrically connected to a gate of the FET.

7. The electromechanical actuator power drive unit in claim 1, wherein the electrical device is a solid state relay configured to close the separate circuit with the windings when the control unit is not energized.

8. The electromechanical actuator power drive unit in claim 1, further comprising one or more resistors in series with the windings and the electrical device, the one or more resistors having a resistance value.

9. The electromechanical actuator power drive unit in claim 8, wherein the one or more resistors each have a variable resistance value.

10. The electromechanical actuator power drive unit in claim 1, wherein the control unit is connected to an external electric power supply.

11. The electromechanical actuator power drive unit in claim 1, wherein the dynamic braking torque is proportional to the rotor velocity and the resistance value.

12. A method for performing a dynamic braking function, the method comprising:
providing a first electric current to an electric motor, the electric motor comprising a stator and a rotor that is rotatable with respect to the stator and windings;
wherein at least one roller is operably connected to the rotor and is configured to receive a load;
allowing current to flow through a parallel current path when the first electric current is not being provided to the electric motor;
allowing the load to rotate the at least one roller when the load translates over the at least one roller;
creating a rotor velocity with the rotating roller;
generating a second electric current in the windings and the electric device in the opposite direction as the first electric current when the first electric current is not being provided to the electric motor; and
creating a dynamic braking torque in the electric motor with the second electric current.

13. The method for performing a dynamic braking function in claim 12, wherein the electric motor is a brushless DC motor having an inverter.

14. The method for performing a dynamic braking function in claim 12, wherein the electric motor is a brushed DC motor.

15. The method for performing a dynamic braking function in claim 12, wherein the electrical device is a relay having a normally closed contact.

16. The method for performing a dynamic braking function in claim 12, wherein the electrical device is an electronic device configured to close the separate circuit with the windings when the electrical power supply is not supplying power.

17. The method for performing a dynamic braking function in claim 12, further comprising one or more resistors in series with the windings and the electrical device, the one or more resistors having a resistance value.

18. The method for performing a dynamic braking function in claim 17, wherein the one or more resistors each have a variable resistance value.

19. The method for performing a dynamic braking function claim 12, wherein the control unit is connected to an external electric power supply.

20. The method for performing a dynamic braking function in claim 12, wherein the dynamic braking torque is proportional to the rotor velocity and the resistance value.

* * * * *

UNITED STATES PATENT AND TRADEMARK OFFICE
CERTIFICATE OF CORRECTION

PATENT NO. : 9,889,990 B2  
APPLICATION NO. : 14/934829  
DATED : February 13, 2018  
INVENTOR(S) : Daniel Dimitrov et al.

Page 1 of 1

It is certified that error appears in the above-identified patent and that said Letters Patent is hereby corrected as shown below:

In the Claims

In Column 8, Claim 19, Line 45, before "claim 12," insert --in--.

Signed and Sealed this  
First Day of May, 2018

Andrei Iancu  
*Director of the United States Patent and Trademark Office*